United States Patent
Ishizuka et al.

(10) Patent No.: US 7,873,789 B2
(45) Date of Patent: Jan. 18, 2011

(54) SYSTEM CONTROLLER, IDENTICAL-ADDRESS-REQUEST-QUEUING PREVENTING METHOD, AND INFORMATION PROCESSING APPARATUS HAVING IDENTICAL-ADDRESS-REQUEST-QUEUING PREVENTING FUNCTION

(75) Inventors: Takaharu Ishizuka, Kawasaki (JP); Toshikazu Ueki, Kawasaki (JP); Makoto Hataida, Kawasaki (JP); Takashi Yamamoto, Kawasaki (JP); Yuka Hosokawa, Kawasaki (JP); Takeshi Owaki, Kawasaki (JP); Daisuke Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 803 days.

(21) Appl. No.: 11/790,266

(22) Filed: Apr. 24, 2007

(65) Prior Publication Data

US 2008/0046695 A1    Feb. 21, 2008

(30) Foreign Application Priority Data

Aug. 18, 2006   (JP)   ............................. 2006-223175

(51) Int. Cl.
*G06F 12/00* (2006.01)
*G06F 13/00* (2006.01)
*G06F 13/28* (2006.01)

(52) U.S. Cl. ............................... 711/133; 711/E12.023
(58) Field of Classification Search ................... 711/133
See application file for complete search history.

(56) References Cited

U.S. PATENT DOCUMENTS

| | | | |
|---|---|---|---|
| 4,695,943 A * | 9/1987 | Keeley et al. | ................ 711/140 |
| 5,875,472 A * | 2/1999 | Bauman et al. | ............. 711/150 |
| 6,112,283 A | 8/2000 | Neiger et al. | |
| 6,442,655 B1 | 8/2002 | Eberhard et al. | |
| 6,560,675 B1 | 5/2003 | Aho et al. | |
| 2006/0179174 A1* | 8/2006 | Bockhaus et al. | ............. 710/22 |
| 2006/0206579 A1* | 9/2006 | Connor et al. | .............. 709/214 |

FOREIGN PATENT DOCUMENTS

JP    2002-522827    7/2002

OTHER PUBLICATIONS

Extended European Search Report issued in corresponding European Patent Application No. 07107195.5, on Jan. 4, 2008.

* cited by examiner

*Primary Examiner*—Sheng-Jen Tsai
(74) *Attorney, Agent, or Firm*—Staas & Halsey LLP

(57) ABSTRACT

In a system controller including a CPU-issued request queue having a circuit that processes plural requests having identical addresses not to be inputted to the CPU-issued request queue, a latest request other than a cache replace request is retained by an input-request retaining section. Consequently, even if an address of an issued request for cache replace request matches an address of a request retained by the CPU-issued request queue, the issued request for the cache replace request is not retried but is queued in the CPU-issued request queue when the address of the issued request for the cache replace request does not match the entire address retained by the input-request retaining section.

11 Claims, 13 Drawing Sheets

| COMMAND (CMD) OF ISSUED REQUEST | RETRY | INPUT REQUEST |
|---|---|---|
| OTHER THAN CACHE REPLACE REQUEST | No | UPDATE INPUT REQUEST |
| | Yes | Valid off |
| CACHE REPLACE REQUEST | No | Valid off |
| | Yes | Valid off |

FIG.3

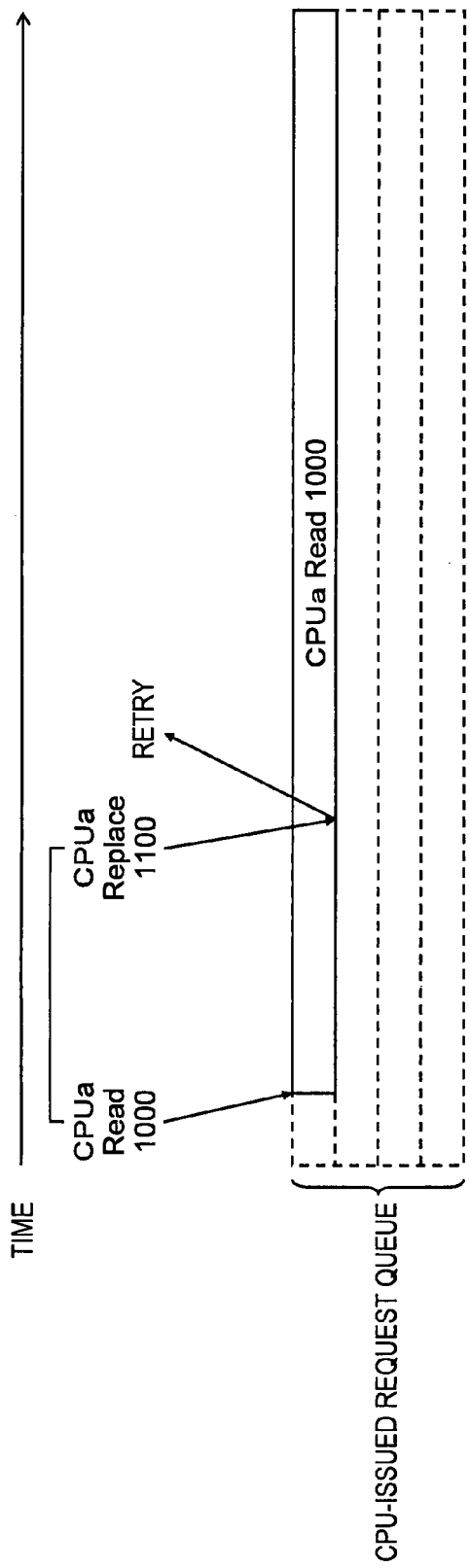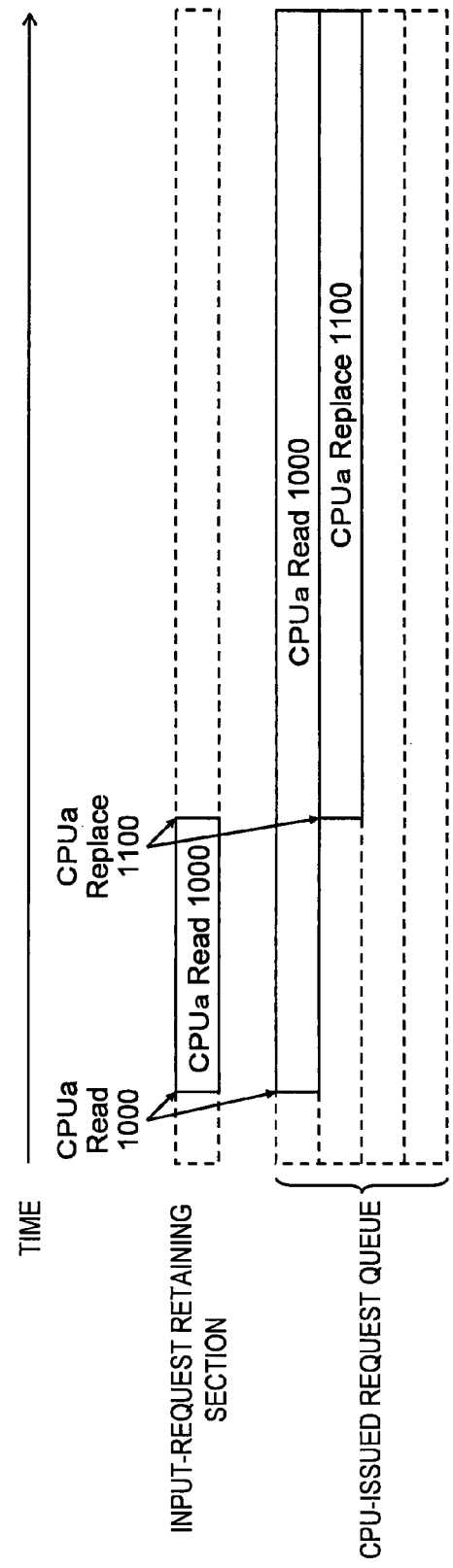

| COMMAND (CMD) OF ISSUED REQUEST | RETRY | INPUT REQUEST |
|---|---|---|
| OTHER THAN CACHE REPLACE REQUEST | No | UPDATE INPUT REQUEST CORRESPONDING TO CPU THAT ISSUES REQUEST |
| | Yes | VALID OFF OF INPUT REQUEST CORRESPONDING TO CPU THAT ISSUES REQUEST |
| CACHE REPLACE REQUEST | No | VALID OFF OF INPUT REQUEST CORRESPONDING TO CPU THAT ISSUES REQUEST |
| | Yes | VALID OFF OF INPUT REQUEST CORRESPONDING TO CPU THAT ISSUES REQUEST |

FIG.6

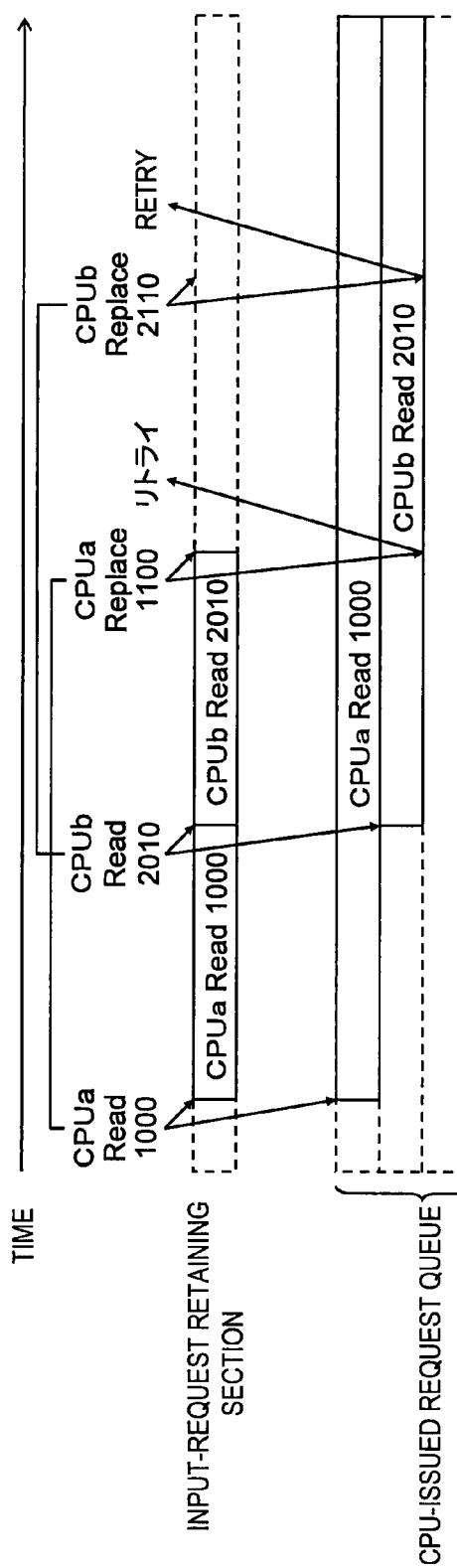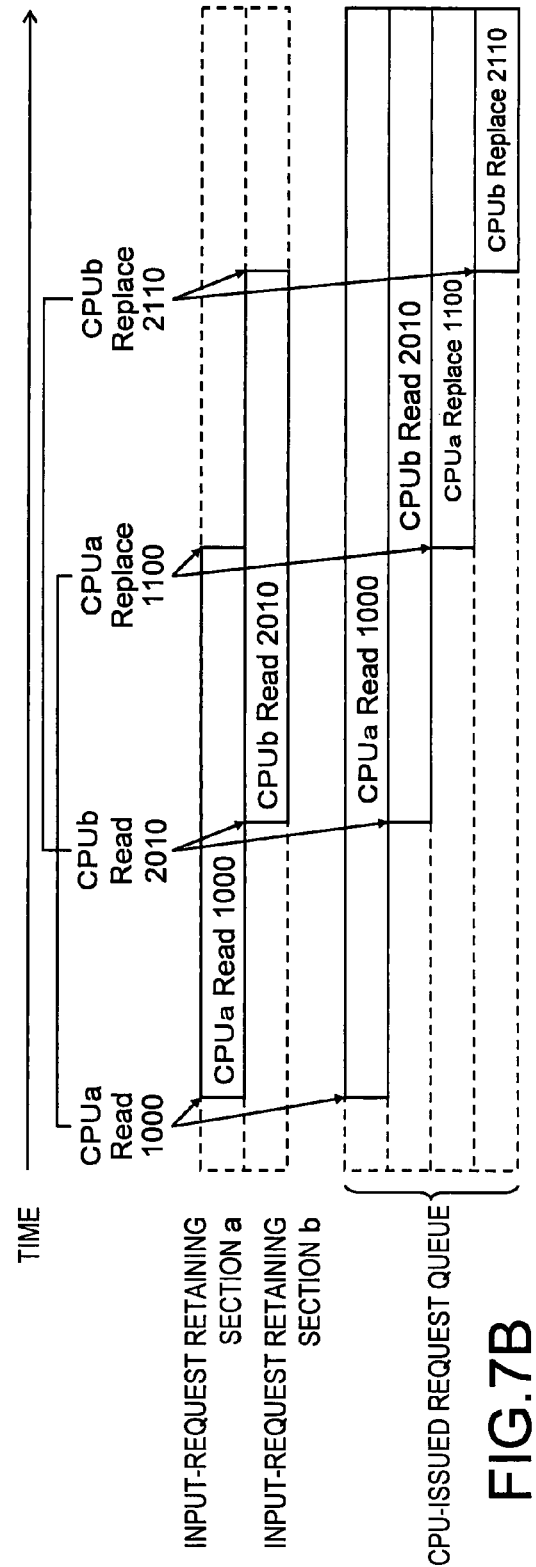

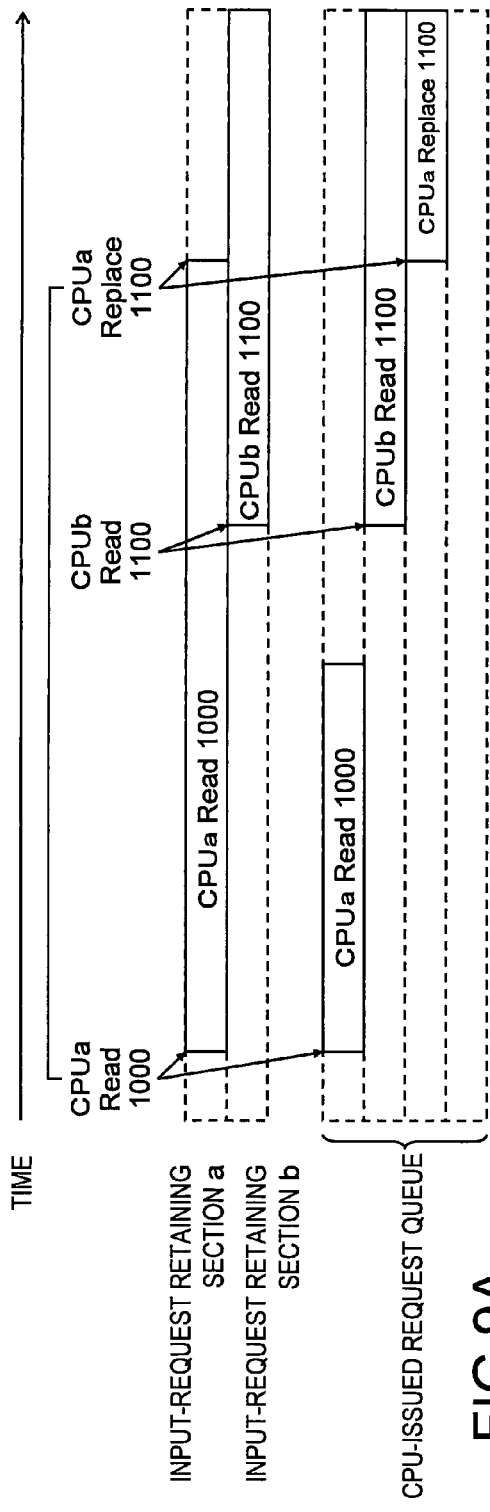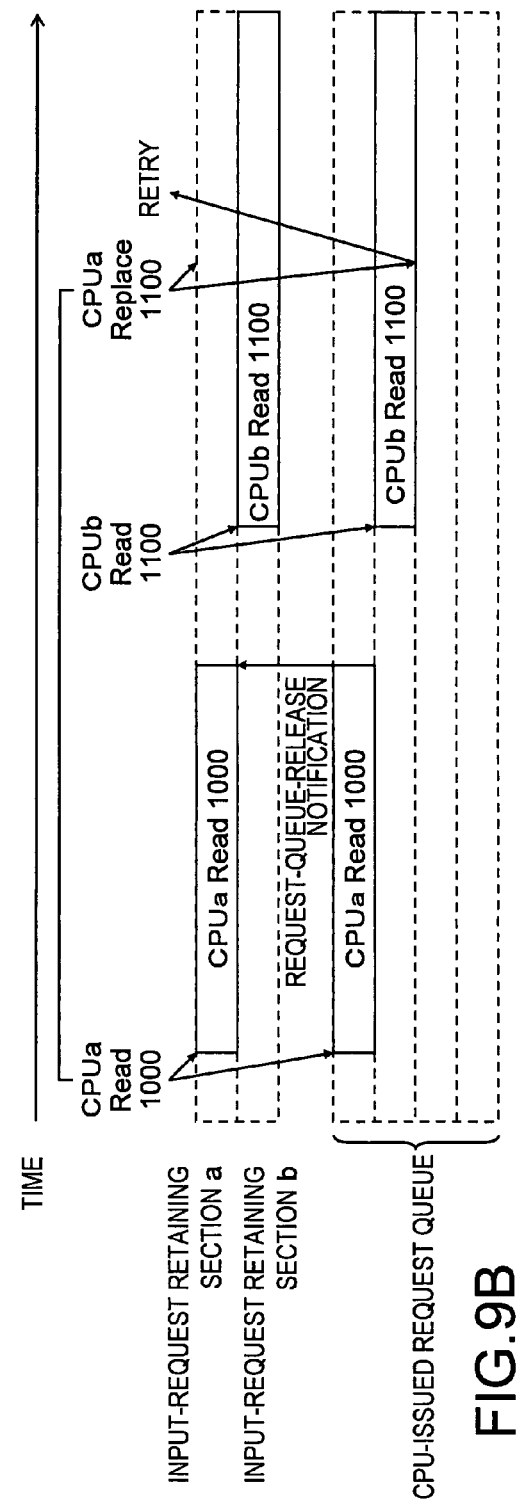

US 7,873,789 B2

SYSTEM CONTROLLER, IDENTICAL-ADDRESS-REQUEST-QUEUING PREVENTING METHOD, AND INFORMATION PROCESSING APPARATUS HAVING IDENTICAL-ADDRESS-REQUEST-QUEUING PREVENTING FUNCTION

CROSS-REFERENCE TO RELATED APPLICATION

This application claims priority from Japanese patent application Serial no. 2006-223175 filed Aug. 18, 2006, the contents of which are incorporated by reference herein.

BACKGROUND OF THE INVENTION

1. Field of the Invention

The present invention relates to a technique for controlling, in a multiprocessor system, requests issued by CPUs using a system controller. More particularly, the present invention relates to a system controller, an identical-address-request-queuing preventing method, and an information processing apparatus that prevent, in retaining requests issued by CPUs in a queue, requests having identical addresses from being retained.

2. Description of the Related Art

In recent years, as information processing apparatuses have been widely used in various fields, a high processing ability of a chip set in a multiprocessor constitution is demanded.

FIG. 12 is a diagram showing an example of a structure of a multiprocessor system. The multiprocessor system shown in FIG. 12 includes four system boards 100a to 10d and an address crossbar board 200. The respective system boards 100a to 100d and the address crossbar board 200 are connected by local buses 300a to 300d, a global bus 301, local notification paths 302a to 302d, a global notification path 303, and the like.

The system board 100a includes a system controller 110 and four CPUs 120a to 120d. The CPU 120a and the CPU 120b are connected to the system controller 110 by a CPU bus 130a. The CPU 120c and the CPU 120d are connected to the system controller 110 by a CPU bus 130c. The system boards 100b to 100d have the same structure as the system board 100a.

The CPUs 120a to 120d include cache memories 121a to 121d and cache tags 122a to 122d, respectively. In an embodiment of the invention, it is assumed that the cache memories 121 are controlled by a 4-Way set associative system.

The system controller 110 includes snoop tags 111a to 111d, CPU-issued request queues 112a and 112c, a local arbiter 113, a request handling section 114, and a request execution section 115.

The snoop tags 111a to 111d correspond to the cache tags 122a to 122d, respectively. The CPU-issued request queues 112 retain requests issued by the CPUs 120 for the CPU buses 130. Specifically, the CPU-issued request queue 112a retains requests issued by the CPUs 120a and 120b and the CPU-issued request queue 112c retains requests issued by the CPUs 120c and 120d. The local arbiter 113 outputs the requests retained by the CPU-issued request queues 112 to the local bus 300a.

The request handling section 114 performs processing for a request sent from the global bus 301. The request handling section 114 includes a resource management section 116 and a request-execution activating section 117. The resource management section 116 checks resources for processing a request. The request-execution activating section 117 starts the request execution section 115 and updates the snoop tags 111.

The address crossbar board 200 includes a global arbiter 210 and an executability determination circuit 220. The global arbiter 210 outputs requests inputted from the local buses 300a to 300d to all the system boards 100a to 100d via the global bus 301. The executability determination circuit 220 determines executability, that is to say, propriety of execution of the request on the basis of notifications inputted from the local notification paths 302a to 302d and notifies the respective system boards 100a to 100d of a result of the determination and information necessary for execution of the requests via the global notification path 303.

Operations of the system shown in FIG. 12 will be explained by giving an example in which the CPU 120a performs a read request. The CPU 120a performs read for an address 1000. An MESI protocol is used for cache coherency. The MESI protocol is a type of a cache coherency protocol and controls respective lines of a cache by classifying the lines into states of M (modified state: Modified), E (exclusive state: Exclusive), S (shared state: Shared), and I (invalid state: Invalid).

In order to check whether data of the address 1000 is present in the cache memory 121a of the CPU 120a, first, the CPU 120a searches through the cache tag 122a. When it is determined as a result of the search that there is no valid data in the cache memory 121a, the CPU 120a issues a read request to the CPU bus 130a.

The request issued by the CPU 120a is inputted to the global arbiter 210 via the CPU-issued request queue 112a, the local arbiter 113, and the local bus 300a. The request inputted to the global arbiter 210 is simultaneously notified to all the system boards 100a to 100d via the global bus 301.

In the system board 100a, the request is inputted to the request handling section 114 from the global bus 301. The request handling section 114 reads the respective snoop tags 111 and checks whether there are resources and the like for processing the request using the resource management section 116. A result of the check is sent to the executability determination circuit 220 via the local notification path 302a.

The executability determination circuit 220 determines executability (propriety of execution) of the request on the basis of notifications from all the local notification paths 302a to 302d. The executability determination circuit 220 notifies the request-execution activating section 117 of a result of the determination and information necessary for execution of the request via the global notification path 303. The request-execution activating section 117 updates the snoop tags 111 and starts the request execution section 115 on the basis of the result of determination on propriety of execution of the request and the information necessary for execution of the request.

For example, when the resources can be secured and all results of searches through the snoop tags 11 indicate I (Invalid), the request-execution activating section 117 registers the address 1000 in the snoop tag 111a. A state of the registration depends on an issued request. At the same time, the request execution section 115 performs read for the address 1000 of a memory and sends data obtained by the read to the CPU 120a. The CPU 120a updates the cache tag 122a.

For example, when the resources can be secured and, as a result of the searches through the snoop tags 111, the address 1000 is registered in the snoop tag 111c in the state of M (Modified), the request-execution activating section 117 registers the address 1000 in the snoop tag 111a. A state of the registration depends on an issued request. The request-execution activating section 117 changes the state of the address 1000 of the snoop tag 111c to S (Shared) or I (Invalid). A state to which the state of the address 1000 is changed in this case depends on an issued request. At the same time, the request execution section 115 instructs the CPU 120c to output M (Modified) data of the address 1000 and sends the outputted data to the CPU 120a. The CPU 120a updates the cache tag 122a. The CPU 120c updates the cache tag 122c.

FIGS. 13A and 13B are diagrams for explaining an example of conventional prevention of queuing of requests having identical addresses. The CPU-issued request queue 112 performs prevention of queuing of requests having identical addresses to prevent the requests having identical addresses from being simultaneously retained. The example of the conventional prevention of queuing of requests having identical addresses in the CPU-issued request queue 112 will be hereinafter explained with reference to FIGS. 13A and 13B.

An issued request is a request issued by the CPU 120 and sent to the CPU-issued request queue 112 via the CPU bus 130. The issued request includes a group of signals such as a command (CMD), a cache line address (ADR0, ADR1, ADR2), and a CPUID. The cache line address is divided into three blocks ADR0, ADR1, and ADR2 and handled. The group of signals of the issued request shown in FIGS. 13A and 13B are signals necessary for the explanation among all signals included in the request.

A retained request is a request retained by each of entries of the CPU-issued request queue 112. The retained request includes a group of signals such as a valid signal (V) and a cache line address (ADR0, ADR1, ADR2). The cache line address is divided into three blocks ADR0, ADR1, and ADR2 and treated. The group of signals of the retained request shown in FIGS. 13A and 13B are signals necessary for the explanation among all signals included in the request.

Each of the entries of the CPU-issued request queue 112 includes a comparator 141 and an AND circuit 142. The AND circuit 142 of each of the entries is connected to an OR circuit 143.

In a method shown in FIG. 13A, in each of the entries of the CPU-issued request queue 112, the comparator 141 compares the cache line address (ADR0, ADR1, ADR2) of the issued request and the cache line address (ADR0, ADR1, ADR2) of the retained request. When both the cache line addresses match each other, the comparator 141 transmits a valid signal "1". When both the cache line addresses do not match each other, the comparator 141 transmits an invalid signal "0". When a signal transmitted from the comparator 141 is valid and the valid signal (V) of the retained request is valid, the AND circuit 142 transmits a valid signal. Otherwise, the AND circuit 142 transmits an invalid signal.

When a signal transmitted from the AND circuit 142 of any one of the entries of the CPU-issued request queue 112 is valid, the OR circuit 143 decides the issued request to be retried. In other words, when a cache line address coinciding with the cache line address (ADR0, ADR1, ADR2) of the issued request is present in the retained request of the CPU-issued request queue 112, queuing of the issued request in the CPU-issued request queue 112 is not performed.

In the method shown in FIG. 13A, it is logically possible to prevent queuing of a completely identical address. However, since an expansion of an address space and an increase in the number of entries of the CPU-issued request queue 112 are demanded in systems in recent years, enormous hardware is necessary in order to check match of the cache line address (ADR0, ADR1, ADR2). Further, since the number of logical stages also increases, it is difficult to realize an increase in speed of the systems. Therefore, in the systems in recent years, as shown in FIG. 13B, a method of checking match of only a part (ADR0) of the cache line address may be adopted.

In a method shown in FIG. 13B, in each of the entries of the CPU-issued request queue 112, the comparator 141 compares a part (ADR0) of the cache line address of the issued request and a part (ADR0) of the cache line address of the retained request. When both the parts of the cache line addresses match each other, the comparator 141 transmits a valid signal. When both the parts do not match each other, the comparator 141 transmits an invalid signal. When a signal transmitted from the comparator 141 is valid and the valid signal (V) of the retained request is valid, the AND circuit 142 transmits a valid signal. Otherwise, the AND circuit 142 transmits an invalid signal.

When a signal transmitted from the AND circuit 142 of any one of the entries of the CPU-issued request queue 112 is valid, the OR circuit 143 decides the issued request to be retried. In other words, when a cache line address, a part of which matches a part (ADR0) of the cache line address of the issued request, is present in the retained request of the CPU-issued request queue 112, queuing of the issued request in the CPU-issued request queue 112 is not performed.

As a prior art document in which a technique concerning a multiprocessor system is written, there is, for example, Patent Document 1 (National Publication of International Patent Application No. 2002-522827). In the prior art document, a technique concerning a multiple processor computer system in which respective nodes are coupled in a ring shape is described. However, it is impossible to solve problems described later using the technique described in the prior art document.

When there are plural identical addresses in the CPU-issued request queue 112, processing for a cache replace request is complicated. For example, when a read request A, a cache replace request B, and a read request B are issued in order by the identical CPU 120 and the cache replace request B and the read request B are simultaneously present in a queue, it is necessary to control the cache replace request B and the read request B to prevent overtaking from occurring. A complicated logic is necessary to perform this control while performing out-of-order processing for the read requests.

When a comparator for a full address is used as shown in FIG. 13A in order to prevent an identical address from being interposed in the CPU-issued request queue 112, a hardware quantity increases. The increase in the hardware quantity makes it difficult to actuate the hardware at a high-frequency clock.

In the method shown in FIG. 13B, in general, a cache index is used for a part (ADR0) of the cache line address. However, since a cache replace request and a read request serving as a parent of the cache replace request (i.e., a read request that makes it necessary to perform cache replace) have an identical index, in the method shown in FIG. 13B, the cache replace request is retried.

SUMMARY OF THE INVENTION

It is an object of the invention to provide a technique that makes it possible to prevent a cache replace request from being retried by mistake while reducing a hardware quantity in prevention of queuing of requests having identical addresses in a system controller.

The present invention is characterized in preventing queuing of requests having identical addresses in a system controller by comparing specific parts of the addresses, when a request issued by a CPU is a cache replace request, it is determined whether the cache replace request is a cache replace request that is subordinate to a read request is issued and queued immediately before the cache replace request. If the cache replace request is such a cache replace request, the cache replace request is not retried.

Specifically, the invention provides a system controller that controls a request issued by a CPU in a multiprocessor system. The system controller includes a CPU-issued request queue having plural entries for retaining the request issued by the CPU, an input-request retaining section that retains a latest request other than a cache replace request issued by the CPU and retained by the CPU-issued request queue, and a retry determination section that determines whether a new request issued by the CPU is retried. The CPU-issued request queue outputs a signal indicating necessity of retry when any one of the entries retains an address, a specific part of which matches a specific part of an address of the new request issued by the CPU. The input-request retaining section outputs a signal for controlling retry when the new request is a cache replace request and the specific part of the address of the new request matches the specific part of the address of the request retained by the input-request retaining section and other parts of the address of the new request do not match the specific part of the address of the request retained by the input-request retaining section. The retry determination section determines, when the CPU-issued request queue outputs the signal indicating necessity of retry and the input-request retaining section does not output the signal for controlling retry, the new request to be retried. Otherwise, the retry determination section causes the CPU-issued request queue to retain the new request without determining the new request to be retried.

This makes it possible to prevent a cache replace request from being retried by mistake while reducing a hardware quantity in prevention of queuing of requests having identical addresses in the system controller.

In the system controller, the input-request retaining section is provided one for each of CPUs and retains a latest request other than a cache replace request issued by the CPU corresponding thereto and retained by the CPU-issued request queue. The retry determination section determines, when the CPU-issued request queue outputs the signal indicating necessity of retry and the input-request retaining section corresponding to the CPU that issues the new request does not output the signal for controlling retry, the new request to be retried. Otherwise, the retry determination section causes the CPU-issued request queue to retain the new request without determining the new request to be retried.

This makes it possible to prevent a cache replace request from being retried by mistake while reducing a hardware quantity even when requests from plural CPUs are mixed in prevention of queuing of requests having identical addresses in the system controller.

In the system controller, the input-request retaining section releases the request retained by the input-request retaining section when the request retained by the CPU-issued request queue corresponding to the request retained by the input-request retaining section is released. This makes it possible to prevent malfunction in that a request, which should originally be retried, is not retried.

In the system controller, the input-request retaining section has a timer function and releases the request retained by the input-request retaining section when a specified time has elapsed after the input-request retaining section retains the request anew. This makes it possible to realize, with a smaller hardware quantity, prevention of malfunction in that a request, which should originally be retried, is not retried.

According to the invention, in prevention of queuing of requests having identical addresses, it is possible to control retry simply by providing, in all entries of the CPU-issued request queue, a circuit for comparing only a specific part of an address rather than a circuit for comparing the entire address and prevent an increase in a hardware quantity. Further, it is possible to prevent a cache replace request from being retried by mistake. Consequently, system performance is improved.

BRIEF DESCRIPTION OF THE DRAWINGS

FIG. 3 is a table for explaining an example of update of an input request;

FIGS. 4A and 4B are diagrams for explaining an effect obtained by providing an input-request retaining section;

FIG. 6 is a table for explaining an example of update of an input request;

FIGS. 7A and 7B are diagrams for explaining an effect obtained by providing an input-request retaining section for each of CPUs;

FIGS. 9A and 9B are diagrams for explaining an effect obtained by providing the input-request retaining section with the function for releasing an input request;

DETAILED DESCRIPTION OF THE PREFERRED EMBODIMENTS

Figure 12:
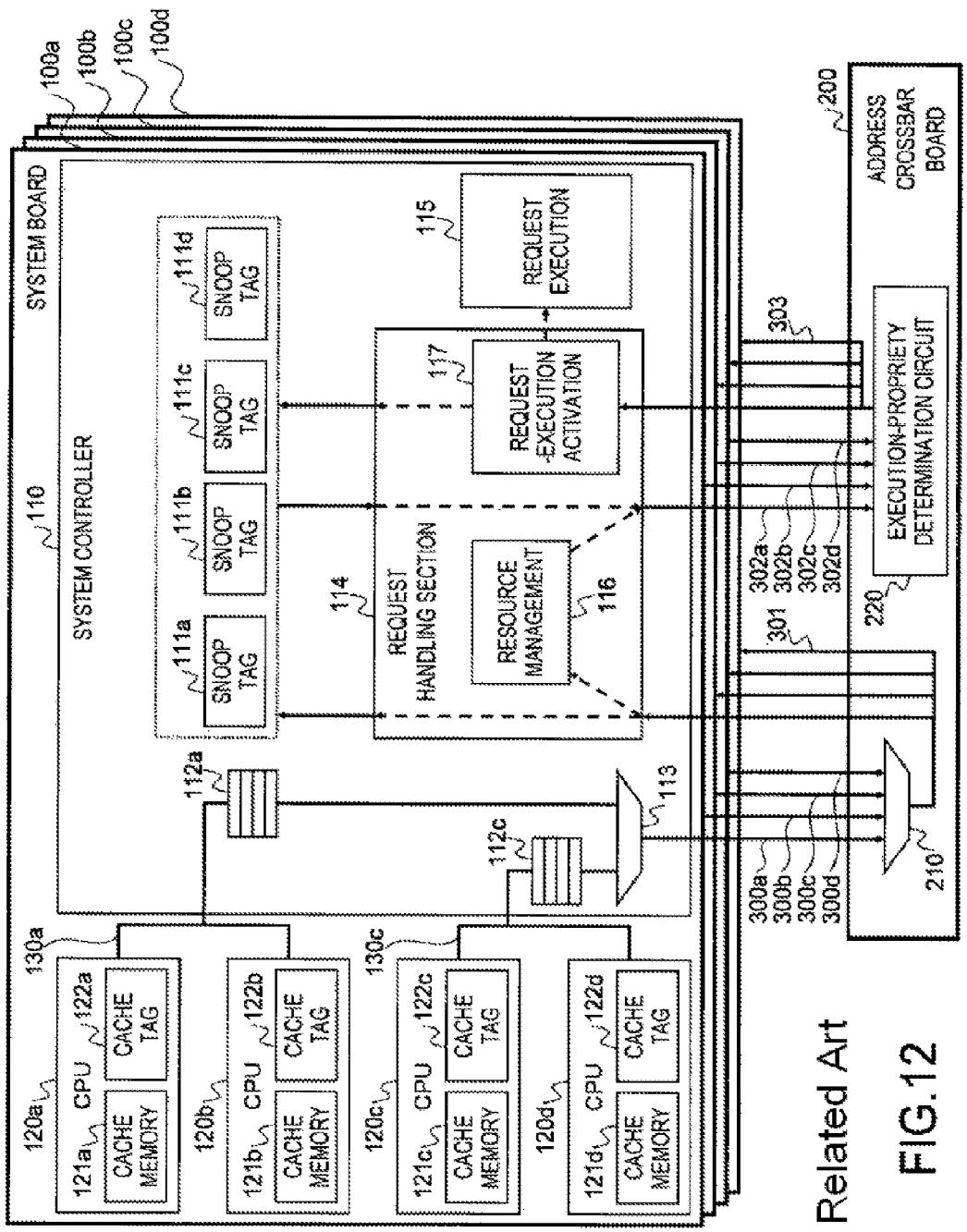
FIG. 12 is a diagram showing an example of a structure of a multiprocessor system.
Figure 13A:
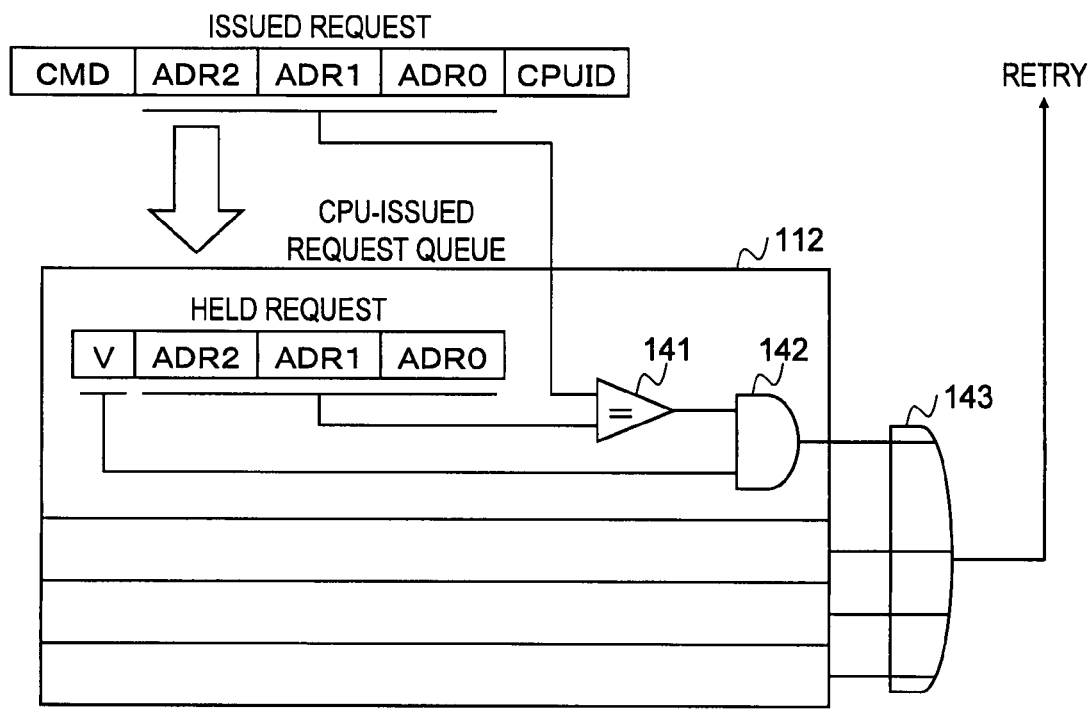
FIGS. 13A and 13B are diagrams for explaining an example of conventional prevention of queuing of requests having identical addresses.
Figure 13B:
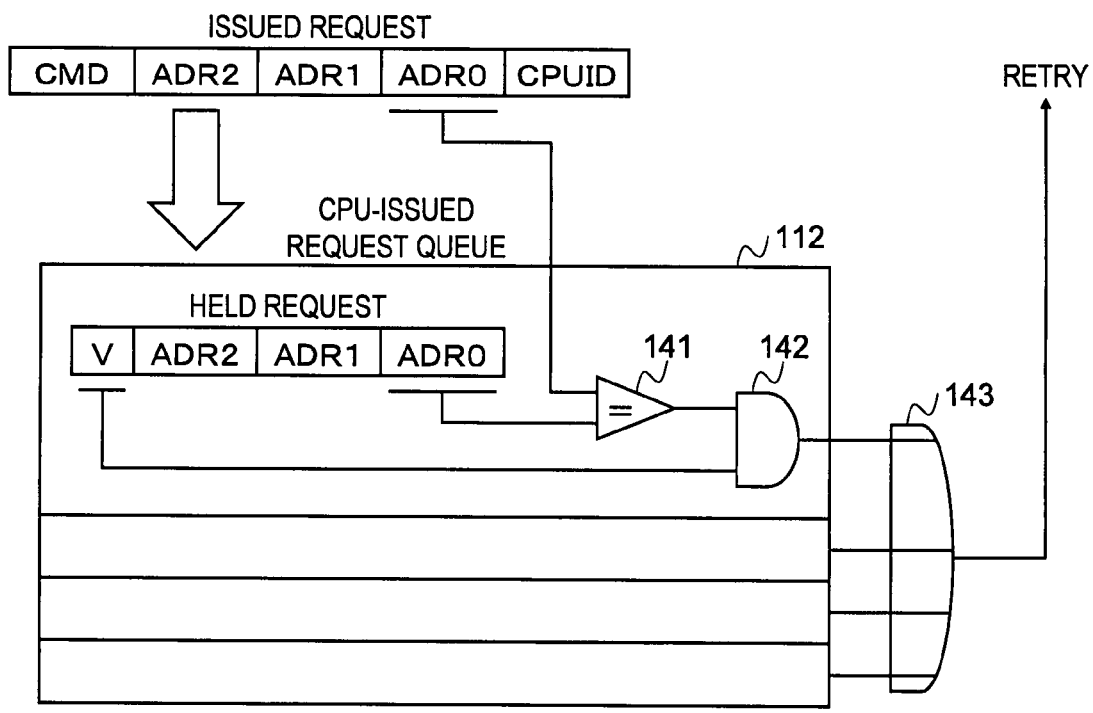

An embodiment of the invention will be hereinafter explained on the basis of the structure of the multiprocessor system in FIG. 12 described above.

Figure 1:
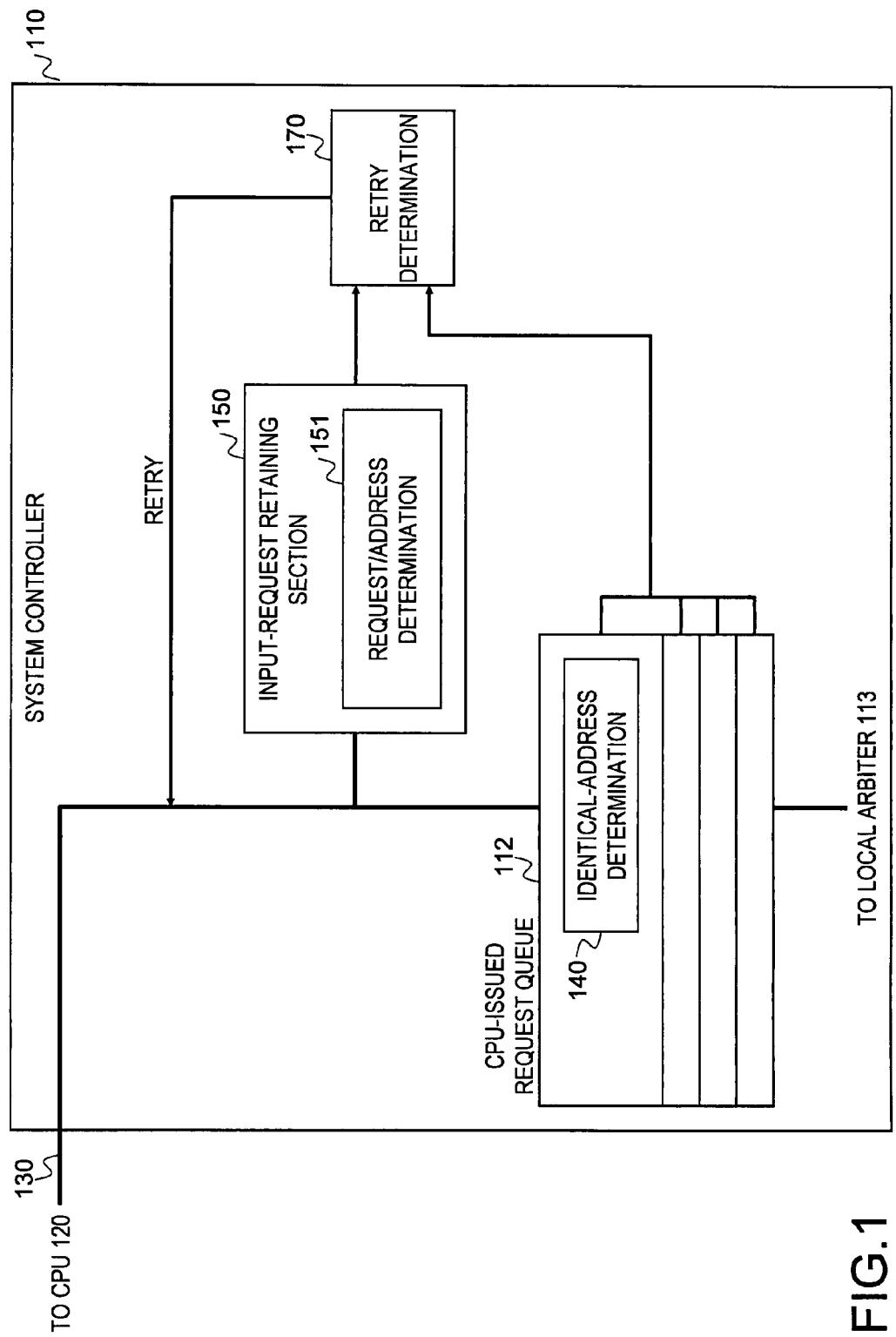
FIG. 1 is a diagram showing an example of a principle structure according to an embodiment of the invention.

FIG. 1 is a diagram showing an example of a principle structure according to an embodiment of the invention. In the following explanation, an issued request is a request issued by the CPU 120 and sent to a CPU-issued request queue 112 via a CPU bus 130. A retained request is a request retained by each of entries of the CPU-issued request queue 112. An input request is a request retained by an input-request retaining section 150.

The CPU-issued request queue 112 includes an identical-address determination section 140 for each of the entries. The identical-address determination section 140 in each of the entries compares a specific part of an address of an issued request and a specific part of an address of a retained request of the entry and determines whether the specific parts match each other.

The input-request retaining section 150 includes a request/address determination section 151. The input-request retaining section 150 retains a latest request other than a cache replace request retained by the CPU-issued request queue 112 as an input request. The request/address determination section 151 determines, for example, whether the issued request is a cache replace request, whether a specific part of an address of the issued request and a specific part of an address of the input request match each other, and whether a part different from the specific part of the address of the issued request and a part different from the specific part of the address of the input request match each other.

A retry determination section 170 determines, on the basis of a result of the determination by the identical-address determination section 140 of each of the entries of the CPU-issued request queue 112 and a result of the determination by the request/address determination section 151 of the input-request retaining section 150, whether the issued request is to be retried.

Figure 2:
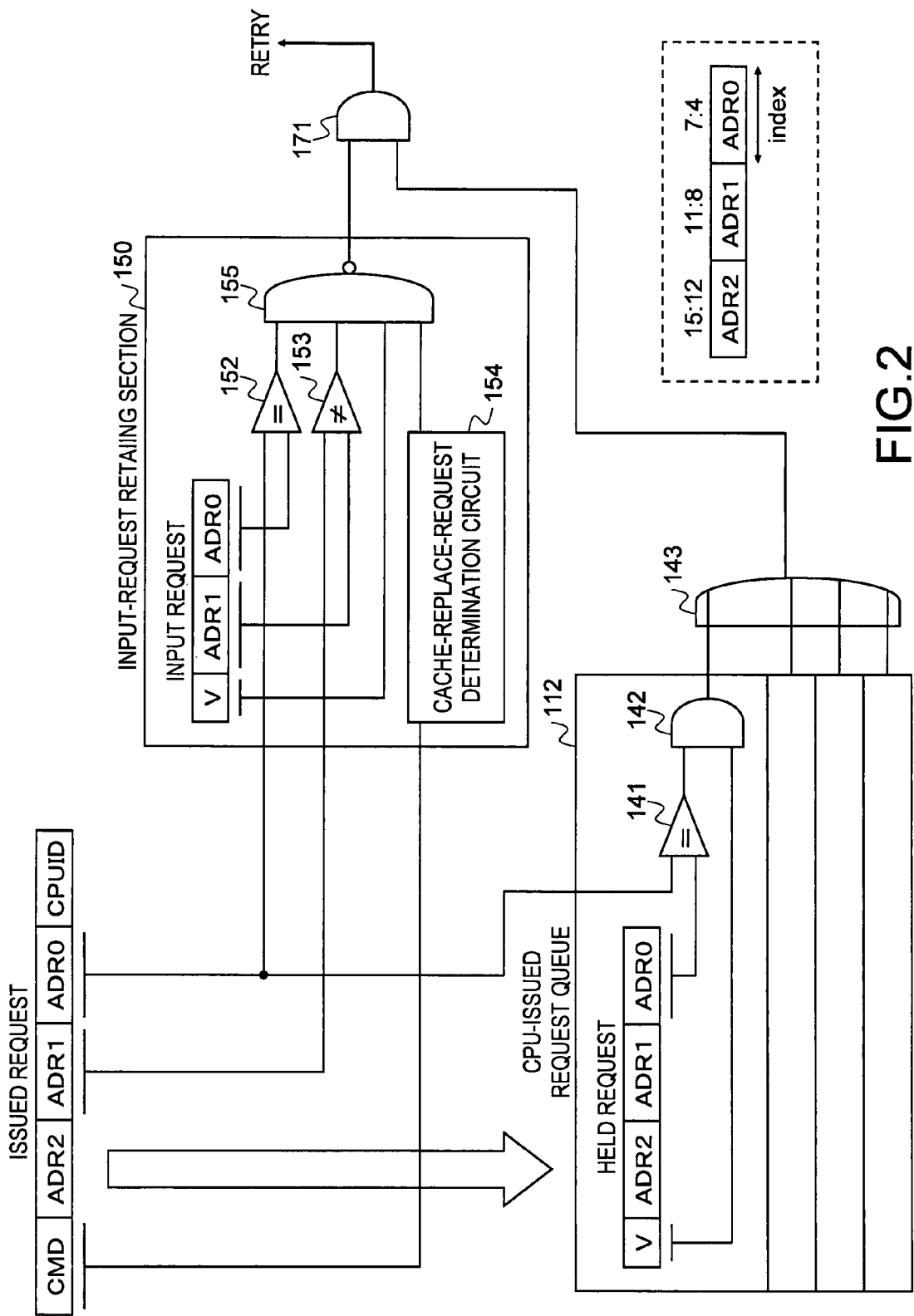
FIG. 2 is a diagram for explaining an example of prevention of queuing of requests having identical addresses according to the embodiment.

FIG. 2 is a diagram for explaining an example (1) of prevention of queuing of requests having identical addresses according to this embodiment. In FIG. 2, an issued request includes a group of signals such as a command (CMD), an address (ADR0, ADR1, ADR2), and a CPUID. A retained request includes a group of signals such as a valid signal (V) and an address (ADR0, ADR1, ADR2). An input request includes a group of signals such as a valid signal (V) and an address (ADR0, ADR1). The groups of signals of the respective requests shown in FIG. 2 are signals necessary for explanation among all the signals included in the requests.

In the example in FIG. 2, an address is represented by 16 bits. ADR2 is from an address bit 15 to an address bit 12, ADR1 is from an address bit 11 to an address bit 8, and ADR0 is from an address bit 7 to an address bit 4. ADR0 is a cache index address.

Each of the entries of the CPU-issued request queue 112 includes a comparator 141 and an AND circuit 142. The AND circuit 142 of each of the entries is connected to an OR circuit 143. The OR circuit 143 is connected to an AND circuit 171.

In each of the entries of the CPU-issued request queue 112, the comparator 141 compares a specific part (ADR0) of the address of the issued request and a specific part (ADR0) of the address of the retained request. The specific parts of the addresses compared are the index addresses (ADR0). When both the specific parts match each other, the comparator 141 transmits a valid signal "1". When both the specific parts do not match each other, the comparator 141 transmits an invalid signal "0".

When a signal transmitted from the comparator 141 is valid and the valid signal (V) of the retained request is valid, the AND circuit 142 transmits a valid signal. Otherwise, the AND circuit 142 transmits an invalid signal.

When a signal transmitted from the AND circuit 142 of any one of the entries of the CPU-issued request queue 112 is valid, the OR circuit 143 transmits a valid signal to the AND circuit 171.

The input-request retaining section 150 includes a comparator 152, a comparator 153, a cache-replace-request determination circuit 154, and a NAND circuit 155. The NAND circuit 155 is connected to the AND circuit 171.

The comparator 152 compares a specific part (ADR0) of the address of the issued request and a specific part (ADR0) of the address of the input request. When both the specific parts match each other, the comparator 152 transmits a valid signal. When both the specific parts do not match each other, the comparator 152 transmits an invalid signal.

The comparator 153 compares a part (ADR1) different from the specific part (ARD0) of the address of the issued request and a part (ADR1) different from the specific part (ADR0) of the address of the input request. ADR1 is 4 bits from an address bit 11 to an address bit 8. However, ADR1 is not limited to the 4 bits and may be another group of bits in the address. When both the parts do not match each other, the comparator 153 transmits a valid signal. When both the parts match each other, the comparator 153 transmits an invalid signal.

The cache-replace-request determination circuit 154 determines, from the command (CMD) of the issued request, whether the issued request is a cache replace request. When the issued request is a cache replace request, the cache-replace-request determination circuit 154 transmits a valid signal. When the issued request is not a cache replace request, the cache-replace-request determination circuit 154 transmits an invalid signal.

When a signal transmitted from the comparator 152 is valid, a signal transmitted from the comparator 153 is valid, a signal transmitted from the cache-replace-request determination circuit 154 is valid, and the valid signal (V) of the input request is valid, the NAND circuit 155 transmits an invalid signal. Otherwise, the NAND circuit 155 transmits a valid signal.

When a signal transmitted from the OR circuit 143 is valid and a signal transmitted from the NAND circuit 155 is valid, the AND circuit 171 decides the issued request to be retried. In other words, as in the past, for an identical index, only one request other than the cache replace request is queued in the CPU-issued request queue 112. Even if the index address (ADR0) of the cache replace request matches that of a latest request queued in the CPU-issued request queue 112, queuing of the cache replace request in the CPU-issued request queue 112 is permitted when another specific part (ADR1) of the address of the cache replace request does not match that of the latest request.

FIG. 3 is a table for explaining an example of update of the input request. Update of the input request retained by the input-request retaining section 150 depends on a type of the command (CMD) of the issued request and presence or absence of occurrence of retry of the issued request.

As shown in FIG. 3, when the issued request is other than a cache replace request and retry does not occur (No), the input request retained by the input-request retaining section 150 is updated with the issued request. When retry occurs (Yes) even if the issued request is other than a cache replace request or when the issued request is a cache replace request, the valid signal (V) of the input request retained by the input-request retaining section 150 is invalidated (Valid off).

As shown in FIG. 3, since the valid signal (V) is updated to be invalid even when the valid signal (V) is not updated with the issued request, the input request is valid only for the next issued request retained by the input-request retaining section 150. In other words, queuing in the CPU-issued request queue 112 of only a cache replace request having an index identical with that of a request immediately after a request other than the cache replace request queued in the CPU-issued request queue 112 is permitted.

FIGS. 4A and 4B are diagrams for explaining an effect obtained by providing an input-request retaining section. An effect of the prevention of queuing of requests having identical addresses shown in FIG. 2 will be explained with reference to FIGS. 4A and 4B. In FIGS. 4A and 4B, time elapses from the left to the right. "Read" indicates a read request and "Replace" indicates a cache replace request. "CPUa" indicates a CPU 120a. An address is represented by 16 bits. Bits 7 to 4 of the 16 bits represent an index address.

FIG. 4A shows an example of prevention of queuing of requests having identical addresses performed when the input-request retaining section 150 is not provided. First, a read request for an address 1000 is issued by the CPU 120a. Since a request having an index identical with that of the read request is not retained by the CPU-issued request queue 112 yet, the read request issued is queued in the CPU-issued request queue 112.

Subsequently, a cache replace request for an address 1100 that is subordinate to the read request for the address 1000 is issued by the CPU 120a. At this point, a request having an index identical with the cache replace request issued (the read request for the address 1000) has already been retained by the CPU-issued request queue 112. The cache replace request issued is retried and is not queued in the CPU-issued request queue 112.

In this way, when the input-request retaining section 150 is not provided, a cache replace request following a parent read request is retried.

FIG. 4B shows an example of prevention of queuing of requests having identical addresses performed when the input-request retaining section 150 is provided. First, a read request for an address 1000 is issued by the CPU 120a. Since a request having an index identical with that of the read request is not retained by the CPU-issued request queue 112 yet, the read request issued is queued in the CPU-issued request queue 112. The read request issued is retained by the input-request retaining section 150.

Subsequently, a cache replace request for an address 1100 that is subordinate to the read request for the address 1000 is issued by the CPU 120a. At this point, a request having an identical index (the read request for the address 1000) has already been retained by the CPU-issued request queue 112. However, the request issued has an index identical with that of the read request retained by the input-request retaining section 150 and has a different address in a part other than the index and is a cache replace request. Thus, the request is queued in the CPU-issued request queue 112. Since the request issued is a cache replace request, the request retained by the input-request retaining section 150 (the read request for the address 1000) is invalid.

In this way, when there is the input-request retaining section 150, the cache replace request following the parent read request is not retried but is queued in the CPU-issued request queue 112.

Figure 5:
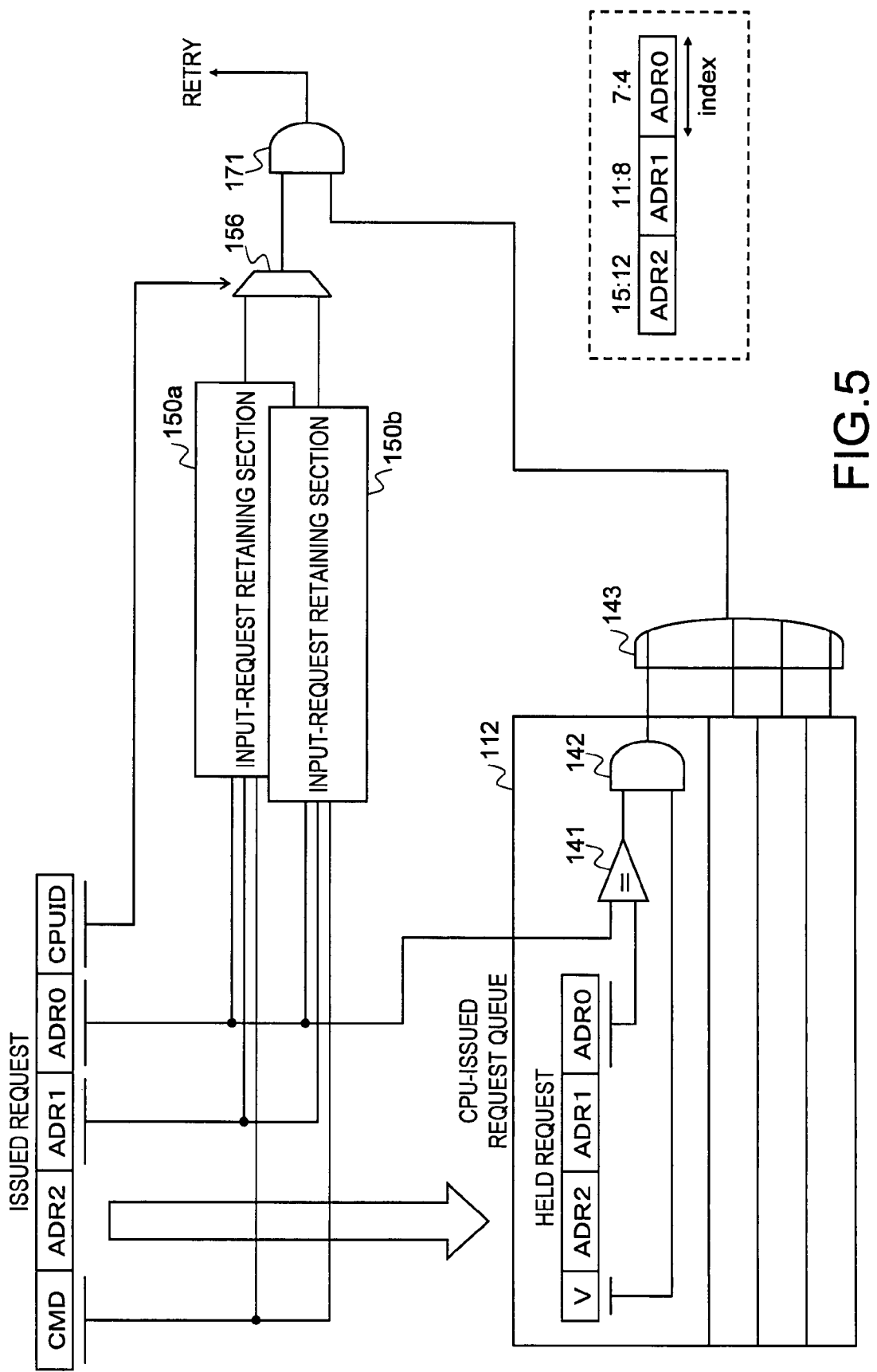
FIG. 5 is a diagram for explaining an example of prevention of queuing of requests having identical addresses according to the embodiment.

FIG. 5 is a diagram for explaining an example of the prevention of queuing of requests having identical addresses according to this embodiment. The example shown in FIG. 2 is on condition that one input-request retaining section 150 is prepared for each of CPU buses 130. The example shown in FIG. 5 is on condition that one input-request retaining section 150 is prepared for each of CPUs 120.

In FIG. 5, an input-request retaining section 150a corresponds to a CPU 120a and an input-request retaining section 150b corresponds to a CPU 120b. In other words, an input request retained by the input-request retaining section 150a is a request issued by the CPU 120a and an input request retained by the input-request retaining section 150b is a request issued by the CPU 120b. As shown in FIG. 12, the CPU 120a and the CPU 120b are connected to an identical CPU bus 130a.

An internal structure of each of the input-request retaining sections 150a and 150b shown in FIG. 5 is the same as that of the input-request retaining section 150 shown in FIG. 2. Operations of each of the input-request retaining sections 150a and 150b shown in FIG. 5 are also the same as those of the input-request retaining section 150 shown in FIG. 2. Thus, explanations of the structure and the operations are omitted. Further, operations of the CPU-issued request queue 112 and the OR circuits 143 shown in FIG. 5 are the same as those of the CPU-issued request queue 112 and the OR circuits 143 shown in FIG. 2. Thus, explanations of the operations are omitted.

When a CPUID of an issued request is a CPUID of the CPU 120a, a selector 156 sends a signal transmitted from the NAND circuit 155 of the input-request retaining section 150a to the AND circuit 171. When a CPUID of an issued request is a CPUID of the CPU 120b, the selector 156 sends a signal transmitted from the NAND circuit 155 of the input-request retaining section 150b to the AND circuit 171.

When the signal transmitted from the OR circuit 143 is valid and the signal sent from the selector 156 is valid, the AND circuit 171 decides the issued request to be retried. Even if the index address (ADR0) of the cache replace request matches that of the latest request issued by the same CPU 120 and queued in the CPU-issued request queue 112, queuing of the cache replace request in the CPU-issued request queue 112 is permitted when another specific part (ADR1) of the address of the cache replace request does not match that of the latest request.

FIG. 6 is a table for explaining an example of the update of an input request. Update of an input request retained by each of the input-request retaining sections 150a and 150b depends on a type of a command (CMD) of a request issued by each of the CPUs 120a and 120b corresponding thereto and presence or absence of occurrence of retry of an issued request.

As shown in FIG. 6, when the issued request is other than a cache replace request and retry does not occur (No), the input request retained by the input-request retaining section 150 corresponding to the CPU 120 that is the source of the issued request is updated with the issued request. When retry occurs (Yes) even if the issued request is other than a cache replace request or when the issued request is a cache replace request, the valid signal (V) of the input request retained by the input-request retaining section 150 corresponding to the CPU 120 that is the source of the issued request is invalidated (Valid off).

As shown in FIG. 6, the input request is updated only when the CPU 120 that is a source of the input request is the same as the CPU 120 that is the source of the issued request. In other words, queuing in the CPU-issued request queue 112 is permitted for a cache replace request having an index identical with that of a request other than the cache replace request issued by the same CPU 120 immediately before the cache replace request and queued in the CPU-issued request queue 112.

FIGS. 7A and 7B are diagrams for explaining effects obtained by providing an input-request retaining section for each of CPUs. An effect of the prevention of queuing of requests having identical addresses shown in FIG. 5 will be explained with reference to FIGS. 7A and 7B. In FIGS. 7A and 7B, time elapses from the left to the right. "Read" indicates a read request and "Replace" indicates a cache replace request. "CPUa" indicates the CPU 120a and "CPUb" indicates the CPU 120b. "Input-request retaining section 'a'" indicates the input-request retaining section 150a and "input-request retaining section 'b'" indicates the input-request retaining section 150b. An address is represented by 16 bits. Bits 7 to 4 of the 16 bits represent an index address.

FIG. 7A shows an example of prevention of queuing of requests having identical addresses performed when the input-request retaining section 150 is provided for each of the CPU buses 130. First, a read request for an address 1000 is issued by the CPU 120a. Since a request having an index identical with that of the read request issued is not retained by the CPU-issued request queue 112 yet, the read request issued is queued in the CPU-issued request queue 112. The read request for the address 1000 issued by the CPU 120a is retained by the input-request retaining section 150a.

Subsequently, a read request for an address 2010 is issued by the CPU 120b. Since a request having an index identical with that of the read request issued is not retained by the CPU-issued request queue 112 yet, the read request issued is queued in the CPU-issued request queue 112. The read request for the address 1000 issued by the CPU 120a, which is retained by the input-request retaining section 150, is updated to the read request for the address 2010 issued by the CPU 120b.

Subsequently, a cache replace request for an address 1100 that is subordinate to the read request for the address 1000 is issued by the CPU 120a. At this point, a request having an index identical with that of the cache replace request issued (the read request for the address 1000) has already been retained by the CPU-issued request queue 112. The request issued does not have an index identical with that of the read request retained by the input-request retaining section 150. Therefore, the cache replace request issued is retried and is not queued in the CPU-issued request queue 112. Since the request issued is the cache replace request, the request retained by the input-request retaining section 150 (the read request for the address 2010 issued by the CPU 120b) is invalidated.

Subsequently, a cache replace request for an address 2110 that is subordinate to the read request for the address 2010 is issued by the CPU 120b. At this point, a request having an index identical with that of the cache replace request (the read request for the address 2010) has already been retained by the CPU-issued request queue 112. A valid request is not retained by the input-request retaining section 150. Therefore, the cache replace request issued is retried and is not queued in the CPU-issued request queue 112.

In this way, when the input-request retaining section 150 is provided for each of the CPU buses 130, between a parent read request issued by a certain CPU 120a and a cache replace request following the parent read request, a request issued by another CPU 120b of the identical CPU bus 130 is interposed. Then, the cache replace request following the parent read request issued by the CPU 120a is retried.

FIG. 7B shows an example of prevention of queuing of requests having identical addresses performed when the input-request retaining section 150 is provided for each of the CPUs 120. First, a read request for an address 1000 is issued by the CPU 120a. Since a request having an index identical with that of the read request issued is not retained by the CPU-issued request queue 112 yet, the read request issued is queued in the CPU-issued request queue 112. The read request for the address 1000 issued by the CPU 120a is retained by the input-request retaining section 150a corresponding to the CPU 120a.

Subsequently, a read request for an address 2010 is issued by the CPU 120b. Since a request having an index identical with that of the read request issued is not retained by the CPU-issued request queue 112 yet, the read request issued is queued in the CPU-issued request queue 112. The read request for the address 2010 issued by the CPU 120b is retained by the input-request retaining section 150b corresponding to the CPU 120b.

Subsequently, a cache replace request for an address 1100 that is subordinate to the read request for the address 1000 is issued by the CPU 120a. At this point, a request having an index identical with that of the cache replace request issued (the read request for the address 1000) has already been retained by the CPU-issued request queue 112. However, the request issued has an index identical with that of the read request retained by the input-request retaining section 150a corresponding to the CPU 120a and has a different address in a part other than the index and is a cache replace request. Thus, the request is queued in the CPU-issued request queue 112. Since the request issued is a cache replace request, the request retained by the input-request retaining section 150a (the read request for the address 1000) is invalid.

Subsequently, a cache replace request for an address 2110 that is subordinate to the read request for the address 2010 is issued by the CPU 120b. At this point, a request having an index identical with that of the cache replace request (the read request for the address 2010) has already been retained by the CPU-issued request queue 112. However, the request issued has an index identical with that of the read request retained by the input-request retaining section 150b corresponding to the CPU 120b and has a different address in a part other than the index and is a cache replace request. Thus, the request is queued in the CPU-issued request queue 112. Since the request issued is a cache replace request, the request retained by the input-request retaining section 150b (the read request for the address 2010) is invalid.

In this way, when the input-request retaining section 150 is provided for each of the CPUs 120, between a parent read request issued by a certain CPU 120a and a cache replace request following the parent read request, a request issued by another CPU 120b of the identical CPU bus 130 is interposed. Even in such a case, the cache replace request following the parent read request issued by the CPU 120a is not retried but is queued in the CPU-issued request queue 112.

Figure 8:
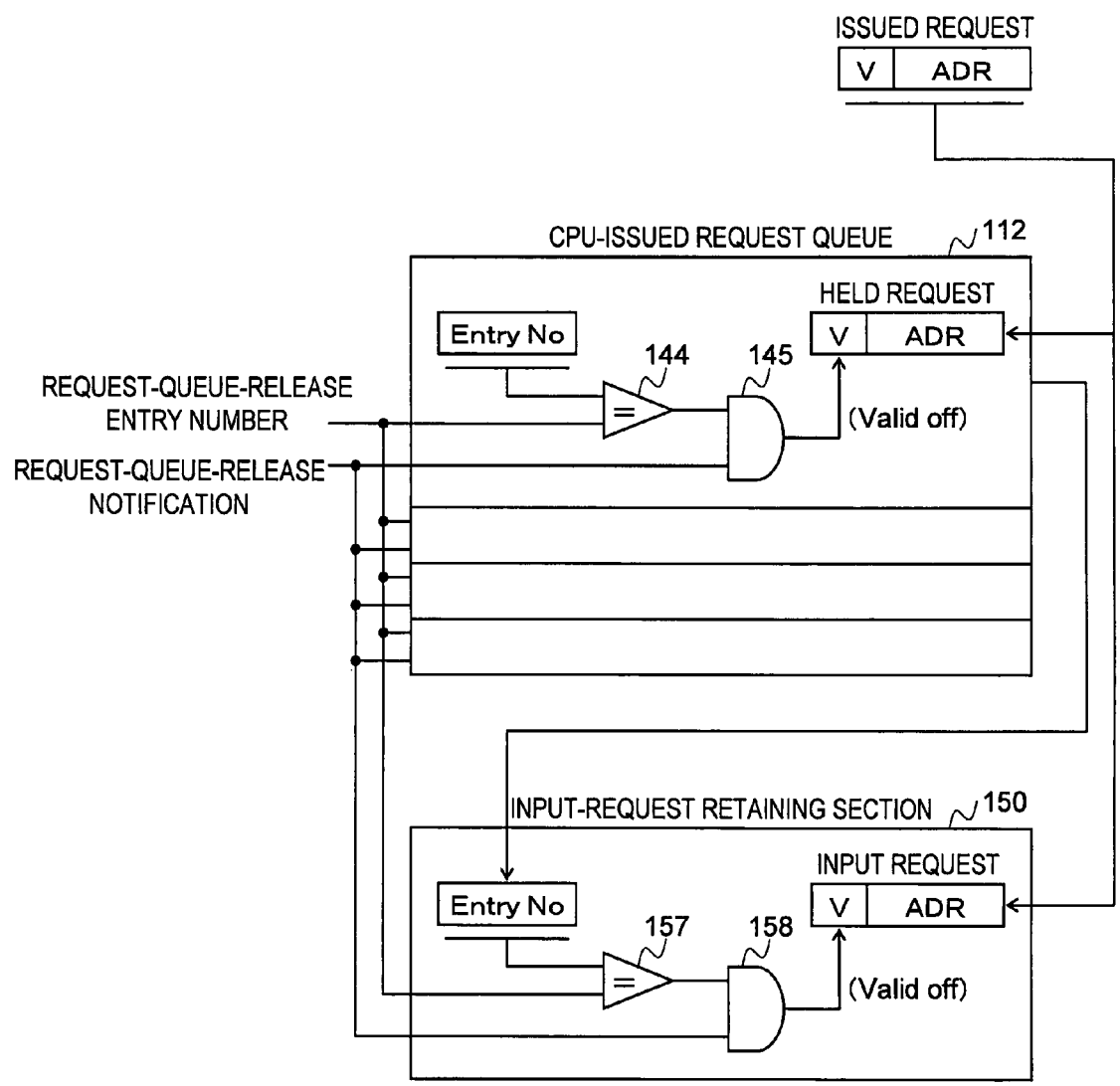
FIG. 8 is a diagram for explaining an example in which the input-request retaining section is provided with a function for releasing an input request.

FIG. 8 is a diagram for explaining an example in which the input-request retaining section is provided with a function for releasing an input request. With the function explained with reference to FIG. 8, when a retained request of the CPU-issued request queue 112 is released and the retained request released is retained by the input-request retaining section 150 as an input request, the input-request retaining section 150 releases the input request. In FIG. 8, an issued request, a retained request, and an input request include a group of signals such as a valued signal (V) and an address (ADR).

Each of the entries of the CPU-issued request queue 112 retains an entry number (Entry No). Each of the entries of the CPU-issued request queue 112 includes a comparator 144 and an AND circuit 145.

In each of the entries of the CPU-issued request queue 112, the comparator 144 compares a request-queue-release entry number designating an entry from which a retained request is released and an entry number (Entry No) retained by the own entry. When both the entry numbers match each other, the comparator 144 transmits a valid signal. When both the entry numbers do not match each other, the comparator 144 transmits an invalid signal.

When a signal transmitted from the comparator 144 is valid and a request-queue-release notification that is a signal notifying the release of the retained request is valid, the AND circuit 145 invalidates the valid signal (V) of the retained request (Valid off).

The input-request retaining section 150 retains an entry number (Entry No) of an entry of the CPU-issued request queue 112 in which a retained request corresponding to the input request retained by the input-request retaining section 150 is retained. The input-request retaining section 150 includes a comparator 157 and the AND circuit 158.

The comparator 157 compares the request-queue-release entry number designating the entry of the CPU-issued request queue 112 from which the retained request is released and the entry number (Entry No) retained by the input-request retaining section 150. When both the entry numbers match each other, the comparator 157 transmits a valid signal. When both the entry numbers do not match each other, the comparator 157 transmits an invalid signal.

When a signal transmitted from the comparator 157 is valid and a request-queue-release notification that is a signal notifying the release of the retained request is valid, the AND circuit 158 invalidates the valid signal (V) of the input request (Valid off).

FIGS. 9A and 9B are diagrams for explaining an effect obtained by providing the input-request retaining section with the function for releasing an input request. In FIGS. 9A and 9B, time elapses from the left to the right. "Read" indicates a read request and "Replace" indicates a cache replace request. "CPUa" indicates the CPU 120a and "CPUb" indicates the CPU 120b. "Input-request retaining section 'a'" indicates the input-request retaining section 150a and "input-request retaining section 'b'" indicates the input-request retaining section 150b. An address is represented by 16 bits. Bits 7 to 4 of the 16 bits represent an index address.

FIG. 9A shows an example in which the input-request retaining section is not provided with the function for releasing an input request. First, a read request for an address 1000 is issued by the CPU 120a. Since a request having an index identical with that of the read request issued is not retained by the CPU-issued request queue 112 yet, the read request issued is queued in the CPU-issued request queue 112. The read request for the address 1000 issued by the CPU 120a is retained by the input-request retaining section 150a.

Before the next request is issued, the read request for the address 1000 retained by the CPU-issued request queue 112 is processed and released from the CPU-issued request queue 112. At this point, since a new request is not issued by the CPU 120a yet, the read request for the address 1000 of the input-request retaining section 150a is not released.

Subsequently, a read request for an address 1100 is issued by the CPU 120b. Since the read request for the address 1000 issued by the CPU 120a has already been released and a request having an index identical with that of the read request is not retained by the CPU-issued request queue 112, the read request issued is queued in the CPU-issued request queue 112. The read request for the address 1100 issued by the CPU 120b is retained by the input-request retaining section 150b corresponding to the CPU 120b.

Subsequently, a cache replace request for an address 1100 that is subordinate to the read request for the address 1000 is issued by the CPU 120a. At this point, a request having an index identical with that of the cache replace request issued (the read request for the address 1100 issued by the CPU 120b) has already been retained by the CPU-issued request queue 112. However, the request issued has an index identical with that of the read request retained by the input-request retaining section 150a corresponding to the CPU 120a and has a different address in a part other than the index and is a cache replace request. Thus, the request is queued in the CPU-issued request queue 112. Since the request issued is a cache replace request, the request retained by the input-request retaining section 150a (the read request for the address 1000) is invalid.

However, the cache replace request for the address 1100 issued by the CPU 120a has an address completely identical with that of the read request for the address 1100 issued by the CPU 120b, which has already been retained by the CPU-issued request queue 112. Originally, a request having an address completely identical with that of a request retained by the CPU-issued request queue 112 should be retried without being queued in the CPU-issued request queue 112.

In this way, when the input-request retaining section is not provided with the function for releasing an input request, in a system in which an interval of time from issuance of a parent read request until issuance of a cache replace request is likely to be longer than a shortest time in which a read request is processed, a request that should originally be retried is queued in the CPU-issued request queue 112.

FIG. 9B shows an example in which the input-request retaining section is provided with the function for releasing an input request. First, a read request for an address 1000 is issued by the CPU 120a. Since a request having an index identical with that of the read request issued is not retained by the CPU-issued request queue 112 yet, the read request issued is queued in the CPU-issued request queue 112. The read request for the address 1000 issued by the CPU 120a is retained by the input-request retaining section 150a.

Before the next request is issued, the read request for the address 1000 retained by the CPU-issued request queue 112 is processed and released from the CPU-issued request queue 112. At this point, according to a request-queue-release notification, the read request for the address 1000 released in the CPU-issued request queue 112 is also released in the input-request retaining section 150a.

Subsequently, a read request for an address 1100 is issued by the CPU 120b. Since the read request for the address 1000 issued by the CPU 120a has already been released and a request having an index identical with that of the read request is not retained by the CPU-issued request queue 112, the read request issued is queued in the CPU-issued request queue 112. The read request for the address 1100 issued by the CPU 120b is retained by the input-request retaining section 150b corresponding to the CPU 120b.

Subsequently, a cache replace request for an address 1100 that is subordinate to the read request for the address 1000 is issued by the CPU 120a. At this point, a request having an index identical with that of the cache replace request issued (the read request for the address 1100 issued by the CPU 120b) has already been retained by the CPU-issued request queue 112. A valid request is not retained by the input-request retaining section 150a corresponding to the CPU 120a. Therefore, the cache replace request issued is retried and is not queued in the CPU-issued request queue 112.

In this way, when the input-request retaining section is provided with the function for releasing an input request, when a request released in the CPU-issued request queue 112 is retained by the input-request retaining section 150, the request retained by the input-request retaining section 150 is also released. Consequently, a request that should originally be retried is retried and is not queued in the CPU-issued request queue 112.

Figure 10:
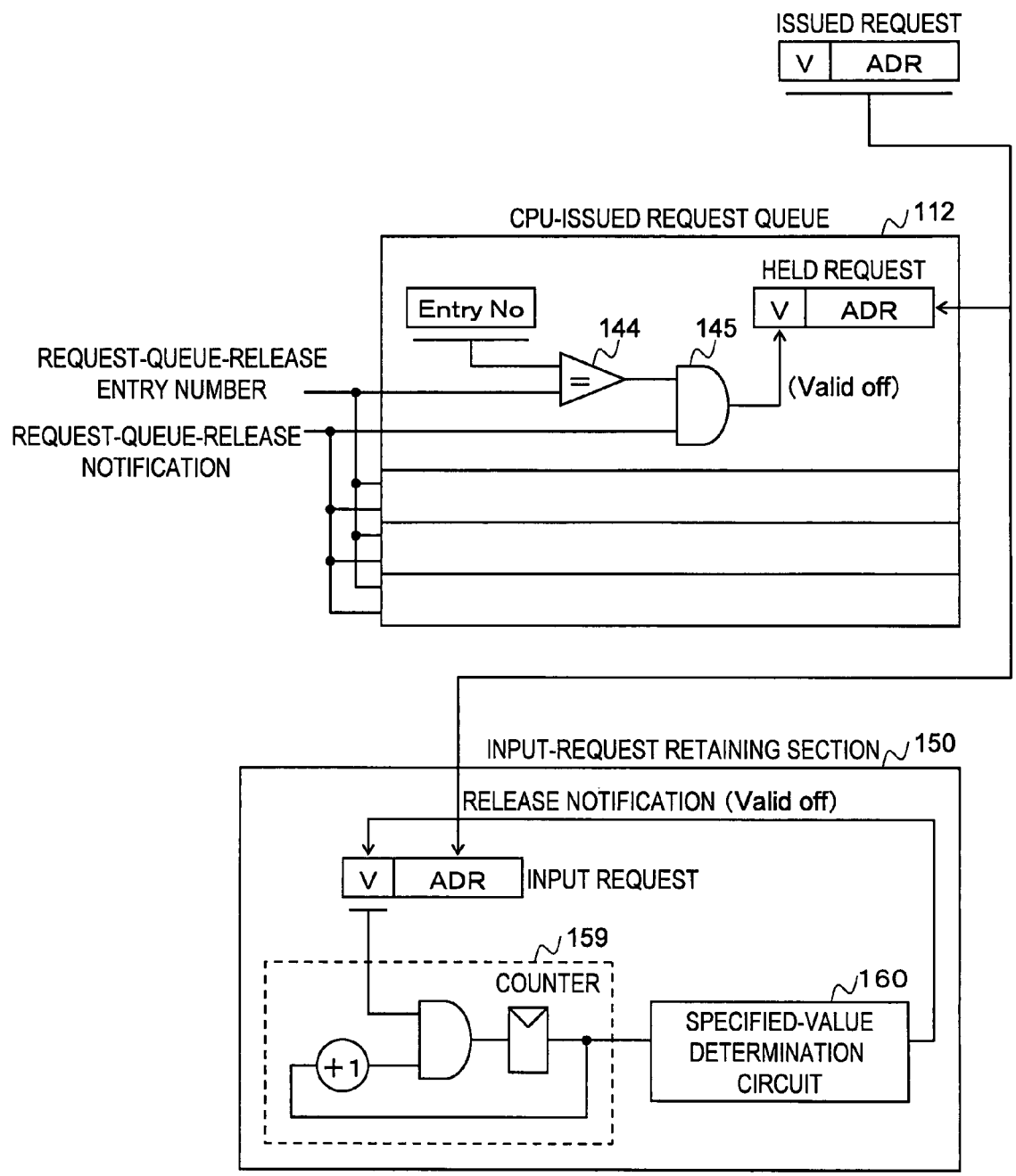
FIG. 10 is a diagram for explaining an example in which the input-request retaining section is provided with a function for releasing an input request using a timer.

FIG. 10 is a diagram for explaining an example in which the input-request retaining section is provided with a function for releasing an input request using a timer. The function for releasing an input request of the input-request retaining section 150 using the timer will be explained with reference to FIG. 10. In FIG. 10, an issued request, a retained request, and an input request include a group of signals such as a valid signal (V) and an address (ADR).

Since release of a retained request in the CPU-issued request queue 112 is the same as that shown in FIG. 8, an explanation of the release of a retained request is omitted. Release of an input request using a timer shown in FIG. 10 is different from the release of an input request according to the release of a retained request of the CPU-issued request queue 112 shown in FIG. 8. An input request is not released in the input-request retaining section 150 with the release of a retained request in the CPU-issued request queue 112 as an opportunity.

The input-request retaining section 150 includes a counter 159 and a specified-value determination circuit 160. In the example in FIG. 10, a timer function is realized by the counter 159 and the specified-value determination circuit 160.

The counter 159 starts count simultaneously with registration of a new request in the input-request retaining section 150. While a valid signal (V) of the input request is valid, the counter 159 increments a count value, for example, for every clock. When the count value of the counter 159 reaches a value N specified in advance, the specified-value determination circuit 160 invalidates the valid signal (V) of the input request according to a release notification (Valid off). The value N is set to a value smaller than a shortest processing time for a read request.

Figure 11:
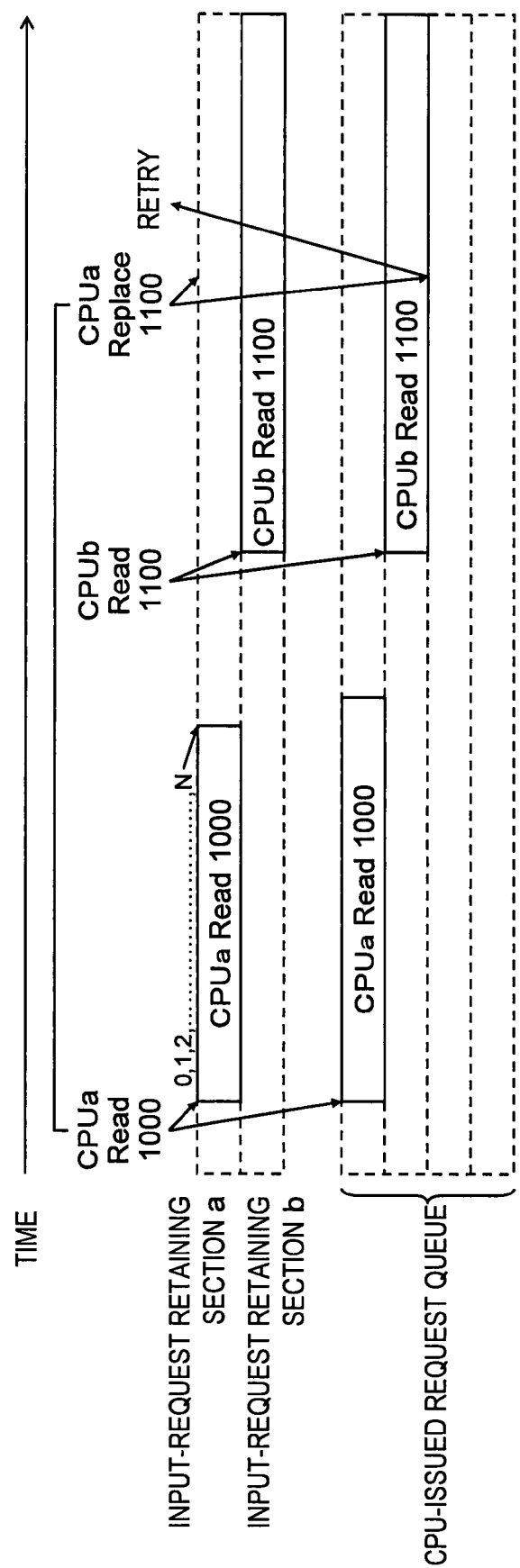
FIG. 11 is a diagram for explaining an effect obtained by providing the input-request retaining section with the function for releasing an input request using a timer.

FIG. 11 is a diagram for explaining an effect obtained by providing the input-request retaining section with the function for releasing an input request. In FIG. 11, time elapses from the left to the right. "Read" indicates a read request and "Replace" indicates a cache replace request. "CPUa" indicates the CPU 120a and "CPUb" indicates the CPU 120b. "Input-request retaining section 'a'" indicates the input-request retaining section 150a and "input-request retaining section 'b'" indicates the input-request retaining section 150b. An address is represented by 16 bits. Bits 7 to 4 of the 16 bits represent an index address.

First, a read request for an address 1000 is issued by the CPU 120a. Since a request having an index identical with that of the read request issued is not retained by the CPU-issued request queue 112 yet, the read request issued is queued in the CPU-issued request queue 112. The read request for the address 1000 issued by the CPU 120a is retained by the input-request retaining section 150a. At this point, the timer is started in the input-request retaining section 150a.

When a specified time elapses on the timer, i.e., when the count value of the counter 159 reaches N in the input-request retaining section 150a, the read request for the address 1000 retained by the input-request retaining section 150a is released. Thereafter, before the next request is issued, the read request for the address 1000 retained by the CPU-issued request queue 112 is processed and released from the CPU-issued request queue 112.

Subsequently, a read request for an address 1100 is issued by the CPU 120b. Since the read request for the address 1000 issued by the CPU 120a has already been released and a request having an index identical with that of the read request is not retained by the CPU-issued request queue 112, the read request issued is queued in the CPU-issued request queue 112. The read request for the address 1100 issued by the CPU 120b is retained by the input-request retaining section 150b corresponding to the CPU 120b.

Subsequently, a cache replace request for an address 1100 that is subordinate to the read request for the address 1000 is issued by the CPU 120a. At this point, a request having an index identical with that of the cache replace request issued (the read request for the address 1100 issued by the CPU 120b) has already been retained by the CPU-issued request queue 112. A valid request is not retained by the input-request retaining section 150a corresponding to the CPU 120a. Therefore, the cache replace request issued is retried and is not queued in the CPU-issued request queue 112.

In this way, when the input-request retaining section is provided with the function for releasing an input request using a timer, it is possible to release a request retained by the input-request retaining section 150 before the request is processed in the CPU-issued request queue 112. Thus, as in the case in which the input request is released with the release of the retained request of the CPU-issued request queue 112 as an opportunity explained with reference to FIGS. 9A and 9B, a request that should originally be retried is retried and is not queued in the CPU-issued request queue 112. If one pitch of the counter 159 is set larger, it is possible to realize prevention of queuing of requests having identical addresses in a system controller with a smaller hardware quantity compared with that in the case in which the input request is released with the release of the retained request of the CPU-issued request queue 112 as an opportunity.

What is claimed is:

1. A system controller for controlling, in a multiprocessor system, a request issued by a CPU, the system controller comprising:

a CPU-issued request queue having plural entries for retaining the request issued by the CPU;

an input-request retaining section for retaining a latest request other than a cache replace request issued by the CPU and retained by the CPU-issued request queue; and a retry determination section for determining whether a new request issued by the CPU is to be retried, wherein the CPU-issued request queue includes a circuit that outputs a signal indicating necessity of retry when any one of the entries retains an address, a specific part of which matches a specific part of an address of the new request issued by the CPU, the input-request retaining section includes a circuit that outputs a signal for controlling not to retry when the new request is a cache replace request and the specific part of the address of the new request matches the specific part of the address of the request retained by the input-request retaining section and other parts of the address of the new request do not match the other part of the address of the request retained by the input-request retaining section, and the retry determination section determines, when the CPU-issued request queue outputs the signal indicating necessity of retry and the input-request retaining section does not output the signal for controlling not to retry, the new request to be retried and, otherwise, causes the CPU-issued request queue to retain the new request without determining the new request to be retried.

2. The system controller according to claim 1, wherein the input-request retaining section is provided one for each of CPUs and retains a latest request other than a cache replace request issued by the CPU corresponding thereto and retained by the CPU-issued request queue, and the retry determination section determines, when the CPU-issued request queue outputs the signal indicating necessity of retry and the input-request retaining section corresponding to the CPU that issues the new request does not output the signal for controlling not to retry, the new request to be retried and, otherwise, causes the CPU-issued request queue to retain the new request without determining the new request to be retried.

3. The system controller according to claim 2, wherein the input-request retaining section releases the request retained by the input-request retaining section and does not output the signal for controlling not to retry when the request retained by the CPU-issued request queue corresponding to the request retained by the input-request retaining section is released.

4. The system controller according to claim 2, wherein the input-request retaining section has a timer function and, when a specified time has elapsed after the input-request retaining section retains the request anew, releases the request retained by the input-request retaining section and does not output the signal for controlling not to retry.

5. An identical-address-request-queuing preventing method performed by a system controller that controls, in a multiprocessor system, a request issued by a CPU in a multiprocessor system, the system controller including a CPU-issued request queue having plural entries for retaining the request issued by the CPU, an input-request retaining section that retains a latest request other than a cache replace request issued by the CPU and retained by the CPU-issued request queue, and a retry determination section that determines whether a new request issued by the CPU is to be retried, wherein the CPU-issued request queue outputs a signal indicating necessity of retry when any one of the entries retains an address, a specific part of which matches a specific part of an address of the new request issued by the CPU, the input-request retaining section outputs a signal for controlling not to retry when the new request is a cache replace request and the specific part of the address of the new request matches the specific part of the address of the request retained by the input-request retaining section and other parts of the address of the new request do not match the other part of the address of the request retained by the input-request retaining section, and the retry determination section determines, when the CPU-issued request queue outputs the signal indicating necessity of retry and the input-request retaining section does not output the signal for controlling not to retry, the new request to be retried and, otherwise, causes the CPU-issued request queue to retain the new request without determining the new request to be retried.

6. The identical-address-request-queuing preventing method according to claim 5, wherein the input-request retaining section is provided one for each of CPUs and retains a latest request other than a cache replace request issued by the CPU corresponding thereto and retained by the CPU-issued request queue, and the retry determination section determines, when the CPU-issued request queue outputs the signal indicating necessity of retry and the input-request retaining section corresponding to the CPU, which issues the new request, does not output the signal for controlling not to retry, the new request to be retried and, otherwise, causes the CPU-issued request queue to retain the new request without determining the new request to be retried.

7. The identical-address-request-queuing preventing method according to claim 6, wherein the input-request retaining section releases the request retained by the input-request retaining section when the request retained by the CPU-issued request queue corresponding to the request retained by the input-request retaining section is released.

8. The identical-address-request-queuing preventing method according to claim 6, wherein the input-request retaining section has a timer function and, when a specified time has elapsed after the input-request retaining section retains the request anew, releases the request retained by the input-request retaining section.

9. An information processing apparatus comprising:
plural processors; and
a system controller that controls requests issued by the processors, wherein the system controller includes:
a request queue that has plural entries for retaining the requests issued by the processors and a circuit that outputs a signal indicating necessity of retry when any one of the entries retains an address, a specific part of which matches a specific part of an address of a new request issued by the processor;
a request retaining section that retains a latest request other than a cache replace request retained by the request queue and outputs a signal for controlling not to retry when the new request is a cache replace request and the specific part of the address of the new request matches the specific part of the address of the request retained by the request retaining section and other parts of the address of the new request do not match the other part of the address of the request retained by the request retaining section; and
a retry determination section that determines when the request queue outputs the signal indicating necessity of retry and the request retaining section does not output the signal for controlling not to retry, the new request to be retried and, otherwise, causes the request queue to retain the new request without determining the new request to be retried.

10. The information processing apparatus according to claim 9, wherein the request queue determines whether a first part of the address of the new request and a first part of the address of the request retained by the request queue match each other.

11. The information processing apparatus according to claim 9, wherein the request retaining section outputs the signal for controlling not to retry when a second part of the address of the new request and a second part of the address of the request retained by the request retaining section do not match each other.

* * * * *